United States Patent
Brodt et al.

(10) Patent No.: US 10,262,033 B2
(45) Date of Patent: *Apr. 16, 2019

(54) METHOD FOR QUERY EXECUTION PLANNING

(71) Applicant: INTERNATIONAL BUSINESS MACHINES CORPORATION, Armonk, NY (US)

(72) Inventors: Andreas Brodt, Gerlingen (DE); Oliver Schiller, Dettingen (DE); Marc Schwind, Holzgerlingen (DE); Mathias Trumpp, Ulm (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 15/073,890

(22) Filed: Mar. 18, 2016

(65) Prior Publication Data

US 2017/0270160 A1  Sep. 21, 2017

(51) Int. Cl.
*G06F 17/30* (2006.01)

(52) U.S. Cl.
CPC .. *G06F 17/30463* (2013.01); *G06F 17/30339* (2013.01); *G06F 17/30469* (2013.01); *G06F 17/30536* (2013.01)

(58) Field of Classification Search
CPC ......... G06F 17/30463; G06F 17/30536; G06F 17/30466; G06F 17/30469; G06F 17/30474; Y10S 707/99933; Y10S 707/99932; Y10S 707/99931; Y10S 707/99935

USPC .......... 707/999.002, 713, 999.003, E17.001, 707/E17.014, E17.017, 688, 714, 718, 707/719, 999.004, 999.005

See application file for complete search history.

(56) References Cited

U.S. PATENT DOCUMENTS

| | | | |
|---|---|---|---|
| 6,757,671 B1 * | 6/2004 | Galindo-Legaria | ......................... G06F 17/30321 |
| 7,877,374 B2 * | 1/2011 | Zabback | ........... G06F 17/30469 707/688 |
| 8,996,544 B2 | 3/2015 | Ziauddin et al. | |
| 2004/0010488 A1 * | 1/2004 | Chaudhuri | ........ G06F 17/30463 |

(Continued)

OTHER PUBLICATIONS

Schnaitter et al.; "Depth estimation for ranking query optimization"; The VLDB Journal; 18:521-542 (Year: 2009).*

(Continued)

*Primary Examiner* — Dennis Truong
(74) *Attorney, Agent, or Firm* — Erik K. Johnson (57) ABSTRACT

The present disclosure provides a computer implemented method and system for processing queries. The first data table comprises a set of data blocks. Each of the set of data blocks may be assigned respective attribute value information. A query involving a query condition on at least a first attribute of the first data table may be received. And a subset of the set of data blocks to be accessed may be selected based on the query condition and using the attribute value information. Furthermore, a guaranteed bound may be determined for a statistical metric on the first attribute based on at least one of the number of data blocks of the subset of data blocks and the attribute value information of the subset of data blocks. The guaranteed bound for the statistical metric may be used when determining a query execution plan for the received query.

12 Claims, 7 Drawing Sheets

(56) References Cited

U.S. PATENT DOCUMENTS

| | | | | |
|---|---|---|---|---|
| 2004/0225639 A1* | 11/2004 | Jakobsson | ......... | G06F 17/30463 |
| 2005/0050041 A1* | 3/2005 | Galindo-Legaria | ......................... | |
| | | | | G06F 17/30463 |
| 2005/0267866 A1* | 12/2005 | Markl | ............... | G06F 17/30463 |
| 2009/0063396 A1* | 3/2009 | Gangarapu | ....... | G06F 17/30321 |
| 2010/0235347 A1* | 9/2010 | Chaudhuri | ........ | G06F 17/30463 |
| | | | | 707/713 |
| 2014/0095472 A1* | 4/2014 | Lee | ................... | G06F 17/30466 |
| | | | | 707/714 |
| 2015/0088812 A1 | 3/2015 | Ziauddin et al. | | |
| 2015/0242452 A1 | 8/2015 | Dickie et al. | | |
| 2015/0286682 A1 | 10/2015 | Ziauddin | | |

OTHER PUBLICATIONS

Haas et al.; "Discovering and Exploiting Statistical Properties for Query Optimization in Relational Databases: A Survey"; Jan. 16, 2009 in Wiley InterScience (www.interscience.wiley.com). (Year: 2009).*

Cárdenas, "Analysis and Performance of Inverted Data Base Structures", Communications of the ACM, vol. 18, No. 5, May 1975, pp. 253-263.

Oracle®, "Database Data Warehousing Guide", 12c Release 1 (12.1), Jul. 2014, http://docs.oracle.com/database/121/DWHSG/zone_maps.htm, pp. 1-25.

IBM: List of IBM Patents or Patent Applications Treated as Related (Appendix P), Apr. 27, 2017, pp. 1-2.

Pending U.S. Appl. No. 15/493,271, filed Apr. 21, 2017, entitled: "Method for Query Execution Planning", pp. 1-36.

* cited by examiner

| $b_i$ | $(\min(b_i), \max(b_i))$. Age |
|---|---|
| b0 | (35, 56) ~ 220.0 |
| b1 | (10, 32) ~ 220.1 |
| b2 | (44, 63) ~ 220.2 |
| ⋮ | ⋮ |
| bN | 220.N |

| $b_i$ | $(\min(b_i), \max(b_i))$. ID |
|---|---|
| b0 | (28, 380) ~ 222.0 |
| b1 | (390, 773) ~ 222.1 |
| b2 | (260, 440) ~ 222.2 |
| ⋮ | ⋮ |
| bN | 222.N |

METHOD FOR QUERY EXECUTION PLANNING

BACKGROUND

The present invention relates to the field of digital computer systems, and more specifically, to a method for processing queries on a data table.

Analytical database systems manage very large amounts of data and are optimized for queries that may read large fractions of it. Query performance in such analytical databases, much more than in OLTP systems, is highly dependent on accurate selectivity estimation for the query optimizer. This is because typical analytical queries do not include point queries but process large fractions of very large tables and include joins order with many tables before they finally reduce the result set by computing an aggregate. Bad plan decisions, such as choosing the wrong join order, makes the difference between query runtimes of seconds or months in these systems. In order to make the right plan decisions, it is crucial for the query optimizer to accurately estimate the selectivity of query parts (predicates, joins, groupings, etc.).

SUMMARY

Various embodiments of the present disclosure provide a method for processing queries on a data table, computer system and computer program product as described by the subject matter of the independent claims. Embodiments of the present invention can be freely combined with each other if they are not mutually exclusive.

The present disclosure implements a system, method, and computer program product for processing queries on a data table. In an embodiment, the method includes providing attribute value information for a set of data blocks. The method includes receiving a query involving a query conditioned on at least a first attribute of the first data table. The method includes selecting a subset of the data blocks to be accessed based on the query condition and using the attribute value information. The method includes determining a guaranteed bound for a statistical metric on the first attribute based on at least one of the number of data blocks of the subset of data blocks and the attribute value information of the subset of data blocks. And the method includes using the guaranteed bound for the statistical metric when determining a query execution plan for the received query.

In another embodiment a computer program product for processing queries on a data table is provided the computer program product includes providing attribute value information for a set of data blocks. The computer program product includes receiving a query involving a query conditioned on at least a first attribute of the first data table. The computer program product includes selecting a subset of the data blocks to be accessed based on the query condition and using the attribute value information. The computer program product includes determining a guaranteed bound for a statistical metric on the first attribute based on at least one of the number of data blocks of the subset of data blocks and the attribute value information of the subset of data blocks. And the computer program product includes using the guaranteed bound for the statistical metric when determining a query execution plan for the received query.

In another embodiment a computer system for processing queries on a data table is provided the computer system includes providing attribute value information for a set of data blocks. The computer system includes receiving a query involving a query conditioned on at least a first attribute of the first data table. The computer system includes selecting a subset of the data blocks to be accessed based on the query condition and using the attribute value information. The computer system includes determining a guaranteed bound for a statistical metric on the first attribute based on at least one of the number of data blocks of the subset of data blocks and the attribute value information of the subset of data blocks. And the computer system includes using the guaranteed bound for the statistical metric when determining a query execution plan for the received query.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may use or exploit the attribute values information on columns or attributes of a discrete data type to estimate statistical metrics of an attribute more accurately. For example, (arbitrarily dependent) query predicates may be evaluated on the attribute value information of attributes to which the predicates refer. And, the subset of data blocks is determined or selected that must be scanned for the query. Finally, in case the statistical metric comprises the dispersion, for every attribute c for which the dispersion is required, the smallest minimum value and the largest max value is determined from the attribute value information of the selected data blocks in order to define a lower bound on the dispersion or an upper bound on the number of distinct values. And in case the statistical metric comprises the cardinality or the number of rows the number of data blocks in the selected subset of data blocks |Q| may be used to derive an upper bound for cardinality.

The term "statistical metric" refers to a numerical quantity calculated from data (e.g. the first data table) for use in the generation of a decision regarding processing of data. An example statistical metric is the mean of values of a given attribute in the processed data.

The term "query plan" or "query execution plan" to an ordered set of one or more steps used to access data in a database system. For example, a query optimizer may be configured so as to use the guaranteed bound to provide a query execution plan. The guaranteed bound may provide an additional constraint for the query optimizer to choose or to provide an improved and most efficient execution plan in term of processing time and processing resources. The above features may thus have the advantage of saving processing resources that would otherwise be required when a processing plan is generated without that additional constraint.

Without having a guaranteed bound (e.g. by having an under- or over-estimated bound) a chosen or a selected execution plan may not be relied on as it may be inappropriate for the system executing the query.

For example, having a low cardinality or a low number of rows (i.e. the guaranteed bound is smaller than a predefined threshold) means that a full table scan may be faster than using an index. The query optimizer may thus be configured to compare the guaranteed bound with the predefined threshold and based on the comparison the query optimizer may select or not an execution plan that would perform a full scan of the subset of data blocks.

Another advantage may be that the present method may make use of the attribute value information as it may be provided at once and subsequent execution plans may be performed for free.

According to one embodiment, the guaranteed bound comprising an upper bound for the statistical metric being the number of distinct values of the first attribute in the subset of data blocks. The dispersion which is the inverse of the number of distinct values may provide an important metric for selectivity estimation in a cost-based database query optimizer.

According to one embodiment, the guaranteed bound comprising an upper bound for the statistical metric being the number of rows in the subset of data blocks.

These embodiments may have the advantage as described above. In particular for planning join query operations. For example, a correct definition of the upper bound of the number of distinct values in a table may enable to accurately select the join method. In one example, the query optimizer may choose or select the order in which to perform the join between the subset of data blocks and a second data table. In particular, the table that returns the fewest number of rows has to be chosen as the driving table for the join. Otherwise, the join may be very inefficient and eventually slows down the overall performance. Thus, by using the right bound for the number of rows a reliable determination of the driving table may be chosen.

In another example, if the upper bound of the number of distinct values is smaller than a given threshold, the query optimizer may select may select to perform a recursive query. However, if the upper bound of the number of distinct values is smaller than a given threshold, the query optimizer may select another method.

In another example, the statistical metric may comprise the dispersion of values of the attribute in the subset of data blocks. The dispersion may be defined as 1/(number of distinct values in the subset of data blocks). In this case, the guaranteed bound may be a lower bound for the dispersion.

According to one embodiment, the upper bound for the number of rows is defined by adding estimated largest possible number of rows in each data block of the subset of data blocks. For example, for row-count based data block definitions (i.e. 1000 rows per block), the estimated largest possible number of rows may be equal to 1000 for each data block of the set of data blocks. For storage-size based blocks largest possible number of rows may be estimated based on the table definition (column data types) i.e. based on the type of data stored on a data block it may be estimated how many rows can possibly be stored in one data block. For example in case of a table having two attributes one integer and the other double (col1 integer, col2 double), every row has 4+8 bytes fixed size. In case of a table having two attributes one integer and the other VARCHAR (col1 integer, col2 VARCHAR(128), every row has between 4+0 and 4+128 bytes etc.

According to one embodiment, the set of data blocks comprising a same number of rows, the upper bound for the number of rows being:

$$\text{table cardinality} * \frac{|Q|}{\text{\# total data blocks}}$$

where "table cardinality" is the number of rows in the first data table, |Q| is the number of data blocks in the subset of data blocks and "#total data blocks" is the number of data blocks in the set of data blocks.

These embodiments may provide an accurate and safe estimation of the number of rows in the subset of data blocks. This may enable a reliable query planning.

According to one embodiment, the attribute value information of the data block being indicative of the minimum and maximum values of the first attribute in the data block, the method comprising determining the smallest minimum ($\alpha_c$) and the largest maximum ($\omega_c$) values of the first attribute, representing a range of values, in the subset of data blocks using the attribute value information of the subset of data blocks, the upper bound for the number of distinct values of the first attribute being defined by the following formula: $\omega_c - \alpha_c + 1$. This embodiment may provide an accurate and safe estimation of the number of distinct values of the first attribute in the subset of data blocks. This may enable a reliable query planning.

According to one embodiment, the range of values comprises at least two sub ranges separated by at least one gap (n) covering a range of values ($\omega_i - \alpha_i + 1$) of the first attribute higher than a predefined threshold gap, the upper bound for the number of distinct values of the first attribute being defined by the following formula:

$$\omega_c - \alpha_c + 1 - \sum_{i=1}^{n} (\omega_i - \alpha_i + 1)$$

This embodiment may further increase the estimation accuracy of the number of distinct values of the first attribute in the subset of data blocks. This may enable a reliable query planning.

According to one embodiment, the first attribute comprises at least one of: integer number, fixed size string, decimals, fixed size strings, Boolean, enumeration. This may enable a seamless integration of the present method in existing systems.

According to one embodiment, the query involves a query condition on the first attribute and a second attribute of the first data table; wherein the query conditions on the first and second attributes are dependent. The present method may particularly be advantageous when processing multiple predicates that must be combined, e.g. as in "salary=80000 AND age=60". Both predicates can be estimated independently from each other. But if the probabilities of the two predicates are not independent (i.e. if 60 year old people are more or less likely to make 80000 than others), their dispersion-based estimates may not simply be multiplied. Boolean AND and OR predicates may cause sets of qualifying data blocks to be intersected or combined.

Figure 1A:
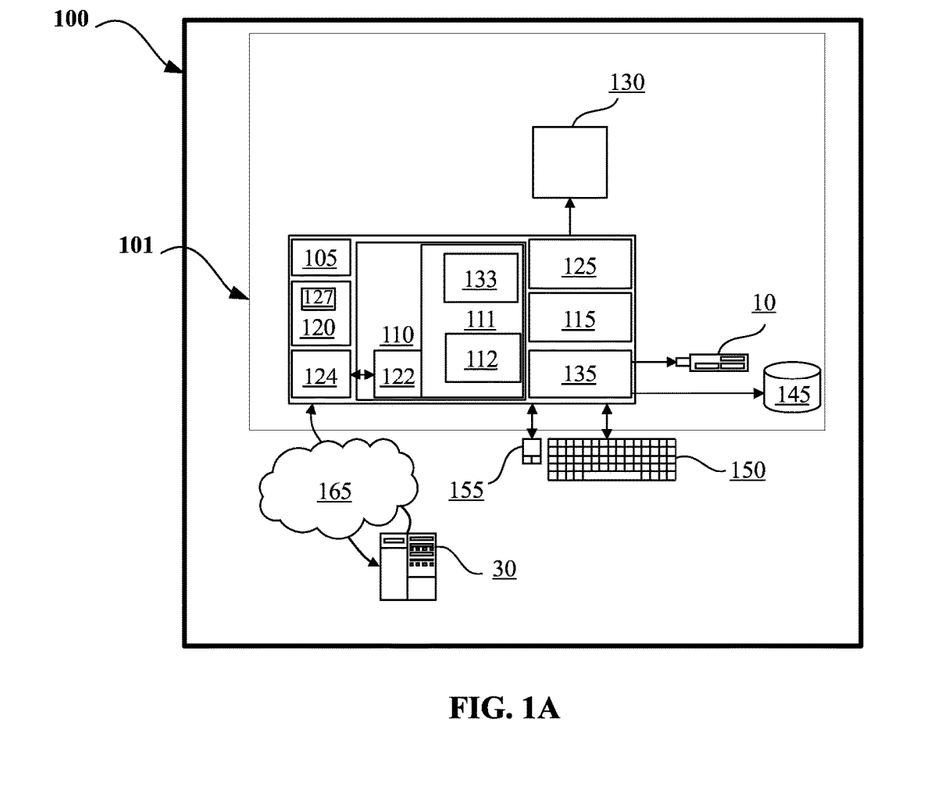
FIG. 1A represents a computerized system, suited for implementing one or more method steps as involved in the present disclosure, in accordance to an embodiment of the present disclosure.

FIG. 1 represents a general computerized system, suited for implementing method steps as involved in the disclosure. It will be appreciated that the methods described herein are at least partly non-interactive, and automated by way of computerized systems, such as servers or embedded systems. In exemplary embodiments, the methods described herein can be implemented in a partly interactive system. These methods can further be implemented in software 112, firmware 122, hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions for software 112 for implementing method for identifying dependencies between components. The memory 110 may further comprise a query optimizer 130. The query optimizer 130 may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program, executable program (object code), script, or any other entity comprising a set of instructions for software 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display within the query optimizer 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 (module 124) and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) such as firmware 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or dataset) 127. For example, the data software 112 may receive (automatically or upon request) as input the data table 127, or may download the data table 127 from storage 120.

Figure 1B:
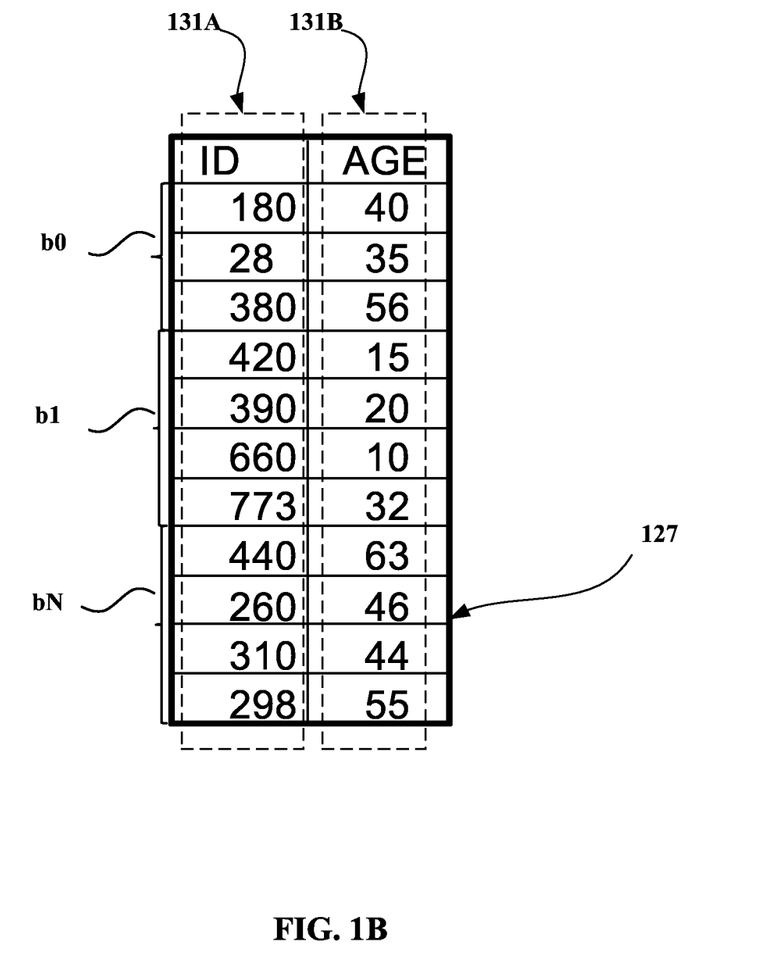
FIG. 1B represents a data table and its contents, in accordance to an embodiment of the present disclosure.

In FIG. 1B a data table such as data table 127 is presented. The data table 127 may comprise one or more columns 131A-N, wherein each column is represented by a respective attribute (e.g. "ID" 131A and "Age" 131B). The rows of the data table 127 may comprise values of the attributes. The data table 127 may for example comprise multiple data blocks b0-bN. For example, the data blocks b0-bN may be created before or while executing the present method. In other words, storing the content of data table 127 (or splitting the data table 127) on data blocks b0-bN may speed up scan performance. While FIG. 1 only shows a few attributes and data blocks, it will be appreciated that numerous attributes and/or data blocks may exist or may be used.

Figure 2A:
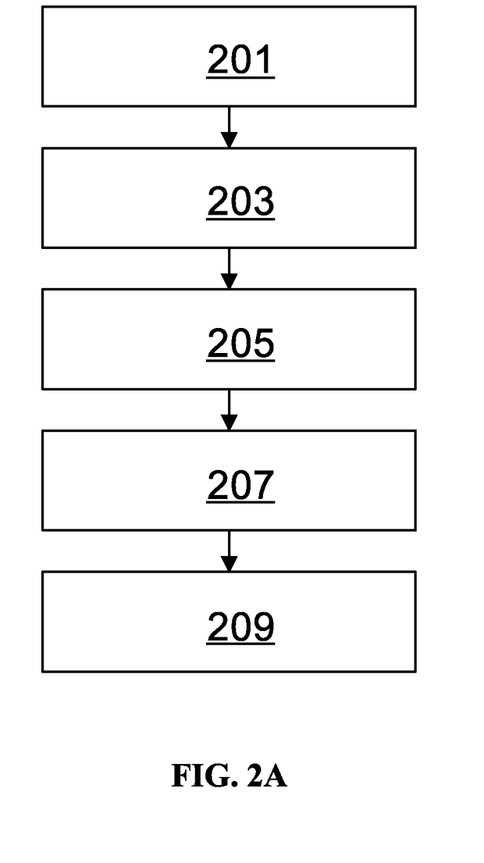
FIG. 2A is a flowchart of a method for processing one or more queries on a first data table, in accordance to an embodiment of the present disclosure.
Figure 2B:
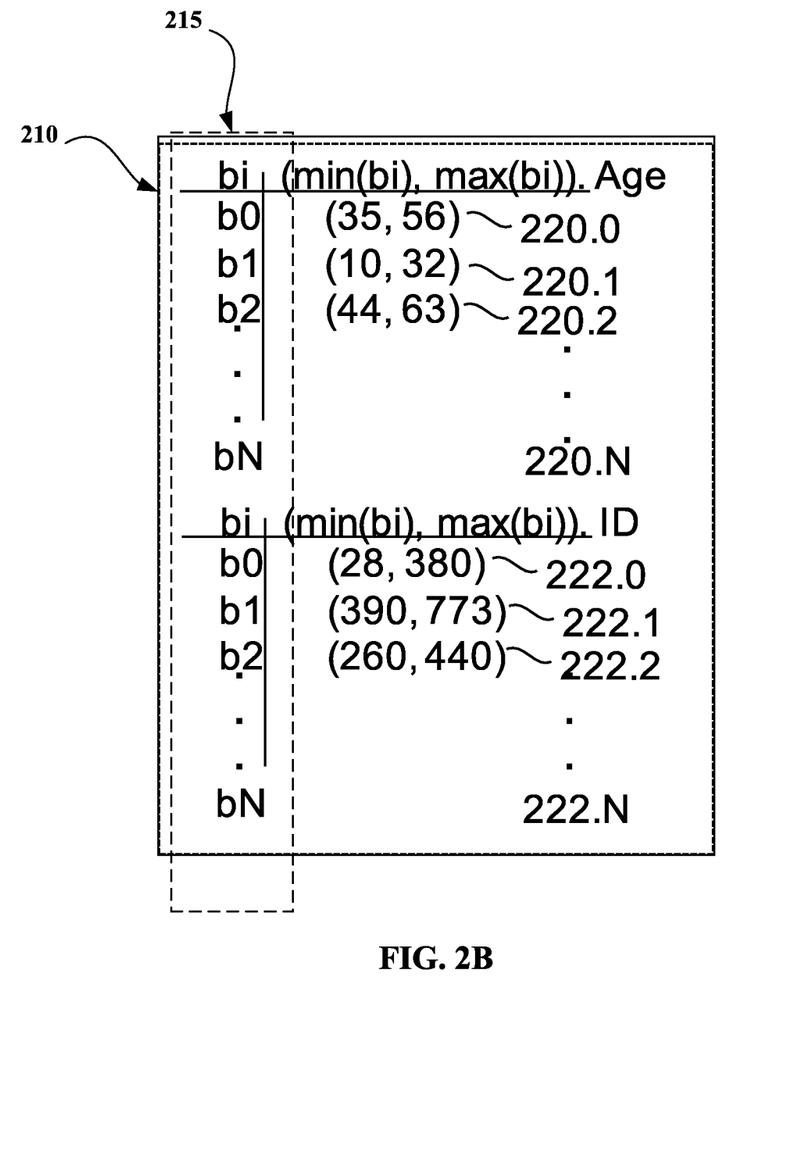
FIG. 2B is a table representing attribute value information, in accordance of the present disclosure.
Figure 2C:
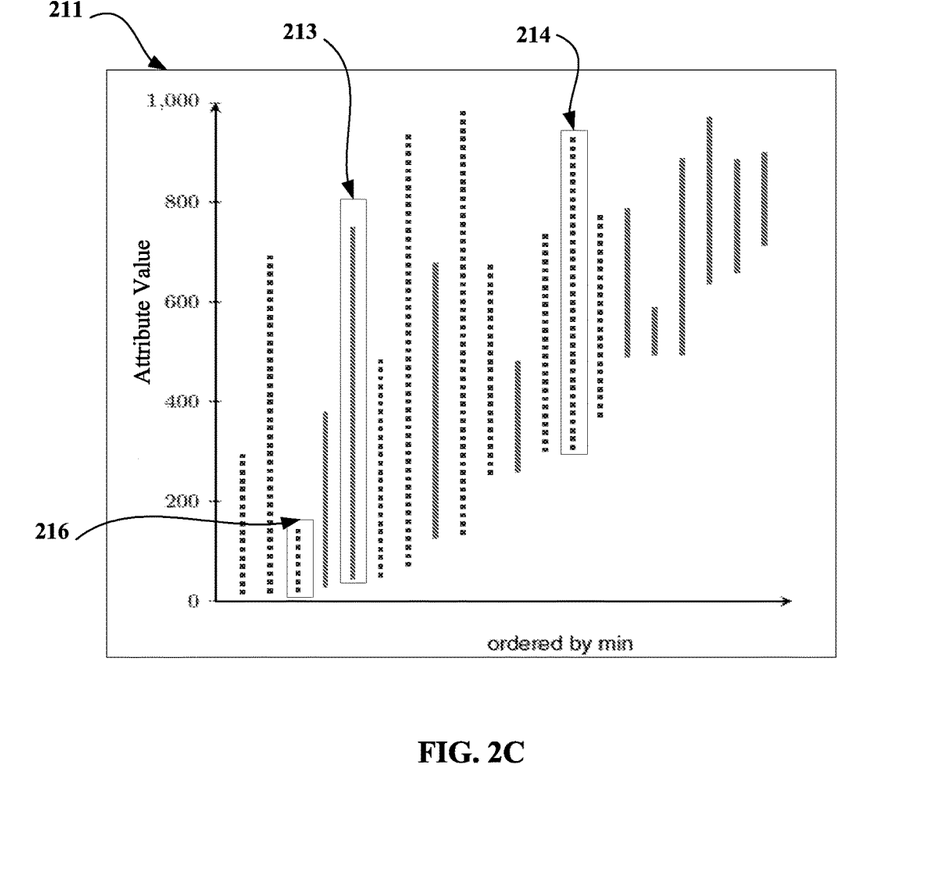
FIG. 2C is a chart representing attribute value information, in accordance of the present disclosure.

FIG. 2A-C are a flowchart, table, and chart of a method for processing queries on a first data table e.g. 127. In step 201, each data block of the set of data blocks b0-bN may be assigned an attribute value information indicative of a range of values 220.0-N of the attribute 131B in the data block as illustrated in table 210 of FIG. 2B. The attribute value information may in addition or alternatively be indicative of a range of values 222.0-N (as illustrated by range 215) of the attribute 131A in the data block. The attribute value information may be provided for at least part of the attribute of the first data table 127. The assigning of the attribute value information to each of the set of data blocks results in at least one extremum (a maximum or minimum) set 220.0-N of maximum and minimum values of the attribute 131B. For example, data block b0 has a minimum value of the "Age" 131.B of 35 and a maximum value of that attribute 131B of 56 and has a minimum value of the "ID" 131.A of 35 and a maximum value of that attribute 131A of 56.

For example, the assigning or providing of the attribute value information may comprise generating a multidimensional data structure (e.g. for each attribute of the first data table 127) for representing the set of data blocks b0-bN. For each data block e.g. b1 of the set of data blocks b0-b9 a respective data element may be added into the multidimensional data structure, wherein the data element has values e.g. 220.1 of data block b1 indicative of the attribute 131B.

The term multidimensional data structure refers to a data structure for indexing multidimensional information. The multidimensional data structure may for example represent a map that is viewed as a two dimensional image, wherein points on the map are stored as data elements on the multidimensional data structure. The multidimensional data structure supports various types of queries, e.g. a range query. For example, the multidimensional data structure comprises a spatial index. The spatial index may be used to divide the indexed space (space defined by the multiple values of the attribute and covering the data elements of the spatial index) into search rectangles (or index rectangles) each comprises a respective number of data elements. For example, a search rectangle may be defined by a lower left corner and an upper right corner. In case, the multiple attribute values assigned to a given data element comprise the minimum and maximum values of the first attribute in the respective data block, the lower left corner may be defined by the lowest minimum and maximum values of the requested range and the upper right corner may be defined by the highest minimum and maximum values of the requested range. Using this data structure only search rectangles that are covered by the query area may be searched. A search rectangle is either completely contained in, partially overlapping with, or disjoint with the query area. If a search rectangle is contained in the query area, then all its contained data elements are part of the query result. As no individual evaluation may be required, a big improvement over the conventional evaluation methods may be reached. Data elements in search rectangles that the query area partly covers may be evaluated individually. Search rectangles that are disjoint with the query area may be ignored. The query area is defined by two or more cuts on respective attribute values of the multiple attribute values.

In step 203, a query involving a query condition on at least the first attribute of the first data table may be received. For example, the received query may comprise a SQL query as follows:
SELECT *
FROM t1 JOIN t2 ON t1.a=t2.a
WHERE t1.Age=20 OR t1.ID>400

This may for example be a typical data warehousing query where t1 is the first data table 127 which may be a dimension table and t2 is a second data table that may be referred to as a fact table.

In step 205, a subset of data blocks may be selected among the set of data blocks b0-bN to be accessed based on the query condition and using the attribute value information. Using the above example, the columns t1.Age and t1.ID may be statistically dependent and the OR expression may be difficult to estimate because of the unknown overlap (t1.Age=20 AND t1.ID>400). However, the expressions "t1.Age=20" and "t1.ID>400" can both initially be defined using the attribute value information 220-222. So the subset of data blocks that may contain respective matches may be selected from the set of data blocks b0-bN using the attribute value information 220-222. In this case, the attribute values information may comprise the range values of the attributes t1.Age and t1.ID. Each of the two attributes 131A and 131B may be assigned a multi multidimensional data structure as described above which may contain the respective attribute value information. These multidimensional data structures may be read or accessed e.g. from the memory 110 or storage 120 in order to select the subset of data blocks that can contain attribute values satisfying the query condition of the example.

FIG. 2C illustrates (utilizing chart 211) the attribute value information 222 for the set of data blocks b0-bN using vertical lines linking the range of values of the attribute 131A for each of the 20 data blocks. For exemplification purpose only 20 data blocks are shown. The subset of data blocks that can contain or satisfy the condition "t1.Age=20 OR t1.ID>400" is represented by a solid line such as solid line 213 and the rest are represented by dashed lines such as line 214. The subset of data blocks in this example is 10 data blocks out of the 20 data blocks.

Figure 3:
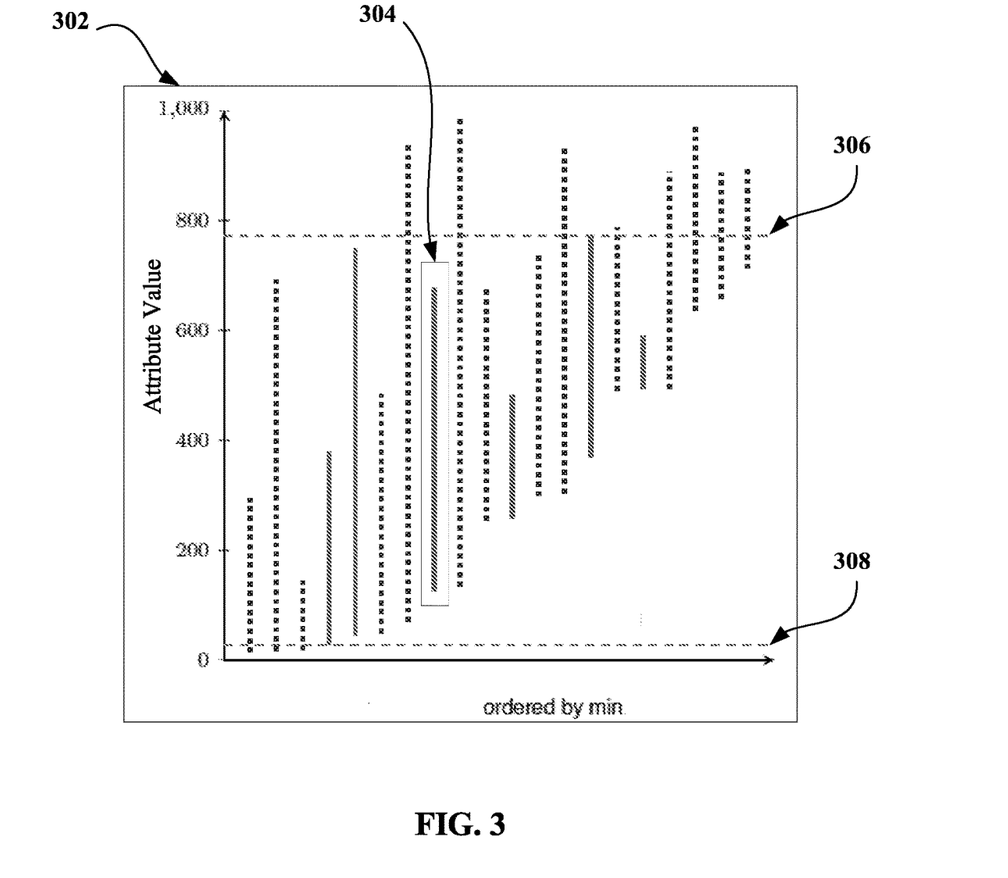
FIG. 3 is a chart which may be used for determining a guaranteed upper bound for the number of distinct values in a subset of data blocks, in accordance of an embodiment of the present disclosure.
Figure 4:
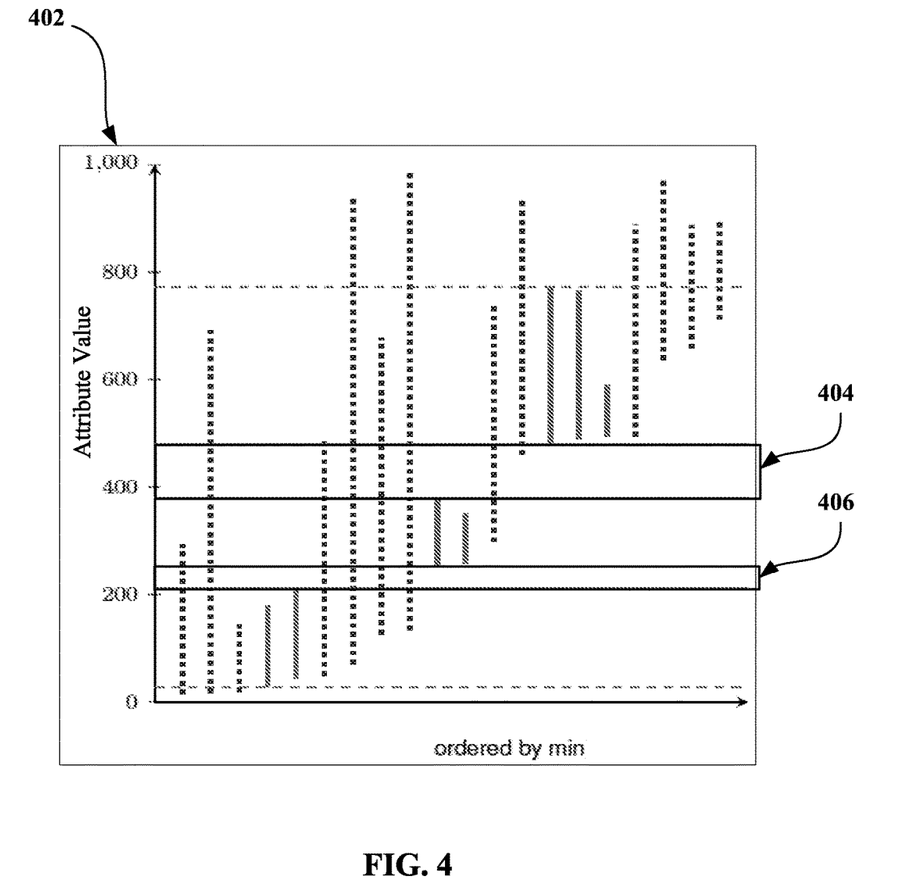
FIG. 4 is a chart which may be used for determining a guaranteed upper bound for the number of distinct values in a subset of data blocks in accordance to an embodiment of the present disclosure.

It must be appreciated that chart 211, in addition to chart 302 shown in FIG. 3 and chart 402 shown in FIG. 4, illustrate plotted zone-map entries sorted by their minimum attribute values for their respective data blocks. Thus, the x axis is purely a nominal scale. The y axis, however, represents the range of attribute values. For example, in FIG. 2C a line that starts at a Y coordinate of 50 and stops at a y coordinate of 180, such as line 216, illustrates that a block exists in the database that has 50 and 180 as its smallest and largest attribute values, respectively. In other words, a zone-map entry exists for this block with min=50 and max=180. In the embodiment presented within the present disclosure the range attribute values (in Y-axis) corresponds to received first data table 127 and more specifically attribute value range of 131A (ID values from FIG. 1B). It must be appreciated that the range of the attribute values, and units will inevitably change depending on the data table received.

In step 207, a guaranteed bound may be determined for a (bounded) statistical metric on the first attribute based on at least one of the number of data blocks of the subset of data blocks and the attribute value information of the subset of data blocks. Using the above example, and in order to create an efficient execution plan for the join, it may be important to estimate its input cardinality, i.e. the number of rows in t1 after the WHERE predicates. FIG. 2 illustrates the min/max ranges of 20 data blocks for column t1.ID. The set Q of qualifying data blocks is illustrated with solid lines. The knowledge of |Q|=10 can be exploited to estimate the cardinality or the number of rows in t1 that match the WHERE predicates and thus the input cardinality of the join.

State-of-the art systems are based on samples (i.e. not 100% accurate). Also, such samples may be outdated as statistics are not gathered frequently. In addition, cardinality must be estimated for every step of the execution plan (to plan the next step/operator). Thus a number of heuristics must be applied to estimate the cardinality after an operation has been executed. This is where things may go wrong in practice and which may be avoided by the present method.

In one example, the guaranteed bound may be an upper bound for the number of rows in table t1. And may be defined by multiplying the number of data blocks e.g. 10 in the subset of data blocks by the maximum number of rows that is in any one of the set of data blocks 20. This may for example be performed using records of the computer system 100 that indicate how many rows are, at most, contained in each data block b0-bN. For example, if the maximum number of rows that may contained in a data block b0-b9 is 1024 rows, then the cardinality or the number of rows in the subset of data blocks cannot exceed |Q|*1024 i.e. the guaranteed bound is |Q|*1024.

In another example, a guaranteed upper bound of the number of rows in the selected subset of data blocks may be defined using the following formula.

$$\text{table cardinality} * \frac{|Q|}{\text{\# total data blocks}}$$

Where "table cardinality" is the number of rows in the first data table t1, |Q| is the number of data blocks in the subset of data blocks and "#total data blocks" is the number of data blocks in the set of data blocks e.g. 20. This assumes that all data blocks, on average, contain about the same number of rows, which may be a reliable guess in particular for large tables.

In step 209, the guaranteed bound for the statistical metric may be used when determining a query execution plan for the received query. Using the above example, the query optimizer 133 may be configured to choose or select the order in which to perform the join between the first data table t1 and the second data table t2 based on the guaranteed bound. In particular, the table that returns the fewest number of rows has to be chosen as the driving table for the join. Otherwise, the join may be very inefficient and eventually slows down the overall performance. Thus, by using the right bound for the number of rows a reliable determination of the driving table may be chosen. In another example, the query optimizer 133 may choose between two join methods based on the determined guaranteed bound. The two join methods comprise the nested-loop join and dynamic hash join.

FIG. 3 illustrates, utilizing chart 302, an example of the set of data blocks and their range of values according to the attribute 131.A. The selected subset of data blocks e.g. of step 205 is represented by solid lines (such as line 304) each indicting the range of values of the attribute 131A in the respective data block. In this example, only six data blocks (i.e. the subset of data blocks) are relevant for the query.

Using this example, further details of step 207 can be provided. For example, the statistical metric may be the number of distinct values in the subset of data blocks that have been selected in step 205. In order to determine an upper bound for the number of distinct values in the subset of data blocks, the smallest minimum value and the largest maximum value of the subset of data blocks may be determined. This for example, may be performed by reading the attribute value information 222.0-N that is assigned to the subset of data blocks. In this example, the smallest minimum value of the subset of data blocks is $\alpha_c=28$ (represented by line 308) and their largest maximum value is $\omega_c=773$ (represented by line 306). Since the data type of the attribute 131A is discrete, e.g. integer or decimal, than at most $(\omega_c-\alpha_c+1)$ distinct values can be contained in the query result. The upper bound (dc) for the number of distinct values in the subset of data blocks may thus be determined as $(\omega_c-\alpha_c+1)$.

Consequently, the rows that are relevant in this query can at most contain 746 different values for attribute "ID" 131A, so that $d_c \le 746$. This may provide an accurate estimation of the lower bound for the number of distinct values in the subset of data blocks. For example, if the lower bound of the number of distinct values is smaller than a given threshold, the query optimizer may select to perform a recursive query. However, if the lower bound of the number of distinct values is smaller than a given threshold, the query optimizer may select another method.

FIG. 4 illustrates, using chart 402, another example method for determining a guaranteed upper bound for the number of distinct values in the selected subset of data blocks. For that, as described above with reference to FIG.

3, the smallest minimum value $\alpha_c$ and the largest maximum value $\omega_c$ of the subset of data blocks may be determined. However, as illustrated in FIG. 4, the value ranges which the selected subset of data blocks cover in attribute 131A can contain holes or gaps in the range of values. A gap may be defined as covering a range of values $(\omega_i-\alpha_i+1)$ of the attribute 131A that is higher than a predefined threshold gap. In this example, the threshold gap is shown equal to 40. Thus two gaps can be identified in FIG. 4. The first gap (gap 404) covers the range of values 212-253 and the second gap (gap 406) covers the range of values 382-479.

In order, to obtain a more accurate estimate of the number of distinct values in the selected subset of data blocks, the holes or gaps may be considered when computing the maximal number of distinct values across the covered range. Referring to the beginning and end (i.e. lowest and highest "missing" value) of the i-th gap as $\alpha_i$ and $\omega_i$, this leads to the following formula for the upper bound (dc≤):

$$\omega_c - \alpha_c + 1 - \sum_{i=1}^{n} (\omega_i - \alpha_i + 1)$$

Which can be written as $$\omega_c - \alpha_c + 1 - \sum_{i=1}^{n} (\omega_i - \alpha_i) - n$$

where n is the number of gaps.

In the example of FIG. 4, the guaranteed lower bound can be lifted from $d_c \le 746$ by taking the holes into account, thus resulting in a more accurate estimate: dc≤773−28+1−(253−212)−(479−382)−2 i.e. dc≤606.

It must be appreciated that the present disclosure, in one embodiment, is a method to determine "how" a query is executed and not "what" the query should output. In an embodiment the user may input a query such as "SELECT name FROM employees WHERE jobrole='manager' AND age<30 ORDER BY salary". In this embodiment, there are several alternative query execution plans or ways to execute the query and produce results for the user. Each one of the query execution plans is associated with a cost and time. Non-limiting examples of query execution plans include: there could be indexes or materialized views defined on the table that are already stored in this order; Should those indexes be used?; Does the result fit in memory?; If yes, should the query pick an in-memory sorting algorithm, otherwise we must use external sorting?; Should the age be compared to 30 first or should the jobrole be filtered before?; Are there any indexes available on the employees table?; Are they applicable for the query predicates filtering age and jobrole?; If yes, should they be used?; and For both predicates or only for one of them? present disclosure provides a method to generate many alternative query execution plans and estimate their costs. Once the costs are estimated, in that embodiment, the cheapest alternative may be chosen. This is the chosen/final execution plan that the query optimizer then passes on to the query execution engine to compute the result of the query or directly perform the query and display the results to the user.

While the present disclosure is particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for generating feedback for query execution, the computer system comprising:
one or more computer processors;
one or more computer-readable storage media;
program instructions stored on the computer-readable storage media for execution by at least one of the one or more processors, the program instructions comprising:
instructions to provide attribute value information for the set of data blocks;
instructions to receive a query involving a query condition on at least a first attribute of the first data table;
instructions to select a subset of the set of data blocks to be accessed based on the query condition and using the attribute value information, wherein the attribute value information of the data block is indicative of a minimum and maximum values of the first attribute in the data block, the method comprising determining a smallest minimum ($\alpha_c$) and a largest maximum ($\omega_c$) values of the first attribute, representing a range of values, in the subset of data blocks using the attribute value information of the subset of data blocks, an upper bound for the number of distinct values of the first attribute being defined by the following formula: $\omega_c - \alpha_c + 1$, wherein the range of values comprises at least two sub ranges separated by at least one gap (n) covering a range of values ($\omega_i - \alpha_i + 1$) of the first attribute higher than a predefined threshold gap, the upper bound for the number of distinct values of the first attribute being defined by the following formula:

$$\omega_c - \alpha_c + 1 - \sum_{i=1}^{n} (\omega_i - \alpha_i + 1);$$

instructions to determine a guaranteed bound for a statistical metric on the first attribute based on at least one of the number of data blocks of the subset of data blocks and the attribute value information of the subset of data blocks; and
instruction to determine a query execution plan for the received query using the guaranteed bound for the statistical metric.

2. The computer system of claim 1, wherein the upper bound for the statistical metric being a number of rows in the subset of data blocks.

3. The computer system of claim 2, wherein the upper bound for the number of rows is defined by adding estimated largest possible number of rows in each data block of the subset of data blocks.

4. The computer system of claim 2, wherein the set of data blocks comprises a same number of rows, the upper bound for the number of rows being:

$$\text{table cardinality} * \frac{|Q|}{\text{\# total data blocks}}$$

wherein table cardinality is the number of rows in the first data table, |Q| is the number of data blocks in the subset of data blocks and #total data blocks is the number of data blocks in the set of data blocks.

5. The computer system 1, wherein the first attribute comprises at least one of: integer number, fixed size string, decimals, fixed size string, Boolean, enumeration.

6. The computer system 1, wherein the query includes a query condition on the first attribute and a second attribute of the first data table, the query conditions on the first and second attributes are dependent on each other.

7. A computer program product for generating feedback for query execution, comprising a computer-readable storage medium having program code embodied therewith, the program code executable by a processor of a computer to perform a method comprising:

providing attribute value information for the set of data blocks;

receiving a query involving a query condition on at least a first attribute of the first data table;

selecting a subset of the set of data blocks to be accessed based on the query condition and using the attribute value information, wherein the attribute value information of the data block is indicative of a minimum and maximum values of the first attribute in the data block, the method comprising determining a smallest minimum ($\alpha_c$) and a largest maximum ($\omega_c$) values of the first attribute, representing a range of values, in the subset of data blocks using the attribute value information of the subset of data blocks, an upper bound for the number of distinct values of the first attribute being defined by the following formula: $\omega_c - \alpha_c + 1$, wherein the range of values comprises at least two sub ranges separated by at least one gap (n) covering a range of values ($\omega_i - \alpha_i + 1$) of the first attribute higher than a predefined threshold gap, the upper bound for the number of distinct values of the first attribute being defined by the following formula:

$$\omega_c - \alpha_c + 1 - \sum_{i=1}^{n}(\omega_i - \alpha_i + 1);$$

determining a guaranteed bound for a statistical metric on the first attribute based on at least one of the number of data blocks of the subset of data blocks and the attribute value information of the subset of data blocks; and determining a query execution plan for the received query using the guaranteed bound for the statistical metric.

8. The computer program product of claim 7, wherein the upper bound for the statistical metric being a number of rows in the subset of data blocks.

9. The computer program product of claim 8, wherein the upper bound for the number of rows is defined by adding estimated largest possible number of rows in each data block of the subset of data blocks.

10. The computer program product of claim 8, wherein the set of data blocks comprises a same number of rows, the upper bound for the number of rows being:

$$\text{table cardinality} * \frac{|Q|}{\text{\# total data blocks}}$$

wherein table cardinality is the number of rows in the first data table, |Q| is the number of data blocks in the subset of data blocks and #total data blocks is the number of data blocks in the set of data blocks.

11. The computer program product 7, wherein the first attribute comprises at least one of: integer number, fixed size string, decimals, fixed size string, Boolean, enumeration.

12. The computer program product 7, wherein the query includes a query condition on the first attribute and a second attribute of the first data table, the query conditions on the first and second attributes are dependent on each other.

* * * * *